(12) United States Patent
Takahashi et al.

(10) Patent No.: US 9,159,146 B2
(45) Date of Patent: Oct. 13, 2015

(54) IMAGE RECONSTRUCTION DEVICE AND IMAGE RECONSTRUCTION METHOD CONFIGURED TO PERFORM ITERATIVELY RECONSTRUCTED IMAGE USING WEIGHT COEFFICIENT

(75) Inventors: Hisashi Takahashi, Tokyo (JP); Taiga Goto, Tokyo (JP); Koichi Hirokawa, Tokyo (JP)

(73) Assignee: HITACHI MEDICAL CORPORATION, Tokyo (JP)

( * ) Notice: Subject to any disclaimer, the term of this patent is extended or adjusted under 35 U.S.C. 154(b) by 0 days.

(21) Appl. No.: 14/128,769

(22) PCT Filed: Jul. 5, 2012

(86) PCT No.: PCT/JP2012/067143
§ 371 (c)(1),
(2), (4) Date: Dec. 23, 2013

(87) PCT Pub. No.: WO2013/008703
PCT Pub. Date: Jan. 17, 2013

(65) Prior Publication Data
US 2014/0193055 A1    Jul. 10, 2014

(30) Foreign Application Priority Data
Jul. 8, 2011   (JP) .................. 2011-151344

(51) Int. Cl.
*G06K 9/00* (2006.01)
*G06T 11/00* (2006.01)
(52) U.S. Cl.
CPC ......... *G06T 11/006* (2013.01); *G06T 2211/412* (2013.01); *G06T 2211/424* (2013.01)
(58) Field of Classification Search
None
See application file for complete search history.

(56) References Cited

U.S. PATENT DOCUMENTS

| 5,909,476 | A  | * | 6/1999 | Cheng et al. | 378/4 |
| 6,507,633 | B1 | | 1/2003 | Elbakri et al. | |
| 2007/0031028 | A1 | * | 2/2007 | Vetter et al. | 382/154 |
| 2007/0147579 | A1 | * | 6/2007 | De Man et al. | 378/16 |
| 2007/0297660 | A1 | * | 12/2007 | Hsieh et al. | 382/131 |

(Continued)

FOREIGN PATENT DOCUMENTS

WO    WO2010-016425    2/2010

OTHER PUBLICATIONS

International Search Report in PCT/JP2012/067142.

*Primary Examiner* — Tahmina Ansari
(74) *Attorney, Agent, or Firm* — Cooper & Dunham LLP

(57) ABSTRACT

To provide an image reconstruction device capable of creating an image with image quality matching the operator's request when a cross-sectional image is reconstructed through a repeated calculation, the image reconstruction device which performs a repeated calculation on the basis of a difference between calculated projection data and measured projection data, the calculated projection data being obtained by performing a forward projection calculation on a reconstructed image which is reconstructed based on the measured projection data, includes an input section to which an image quality parameter which is considered to be important by an operator is input, a weight calculation section that calculates a weighting coefficient on the basis of the image quality parameter, and a repeated calculation section that performs a repeated calculation on the basis of a value obtained by weighting and adding a pixel value obtained in the previous iteration to a pixel value obtained from now using the weighting coefficient.

9 Claims, 6 Drawing Sheets

(56) References Cited

U.S. PATENT DOCUMENTS

| | | | |
|---|---|---|---|
| 2008/0253502 A1* | 10/2008 | Ziegler et al. | 378/4 |
| 2008/0273778 A1* | 11/2008 | Goto et al. | 382/131 |
| 2010/0128958 A1* | 5/2010 | Chen et al. | 382/132 |
| 2010/0246751 A1* | 9/2010 | Bruder et al. | 378/4 |
| 2011/0052023 A1* | 3/2011 | Garg et al. | 382/131 |
| 2011/0091007 A1* | 4/2011 | Betcke et al. | 378/4 |
| 2011/0135182 A1* | 6/2011 | Goto et al. | 382/131 |
| 2013/0177132 A1* | 7/2013 | Takahashi et al. | 378/4 |
| 2014/0193055 A1* | 7/2014 | Takahashi et al. | 382/131 |
| 2014/0226887 A1* | 8/2014 | Takahashi et al. | 382/131 |

* cited by examiner

IMAGE RECONSTRUCTION DEVICE AND IMAGE RECONSTRUCTION METHOD CONFIGURED TO PERFORM ITERATIVELY RECONSTRUCTED IMAGE USING WEIGHT COEFFICIENT

TECHNICAL FIELD

The present invention relates to an image reconstruction device and an image reconstruction method capable of reconstructing a cross-sectional image through a repeated calculation on the basis of measured projection data which is acquired by an X-ray CT (Computed Tomography) device, and particularly to a technique of improving image quality while maintaining the features of an initial image.

BACKGROUND ART

An X-ray CT apparatus reconstructs a cross-sectional image on the basis of measured projection data from various angles which are acquired by irradiating X rays from surroundings of an object, thereby displaying a cross-sectional image. A method of reconstructing a cross-sectional image based on the measured projection data is roughly classified into an analysis method and an iterative method. The analysis method is a method of analytically producing an image on the basis of the cut surface projection theorem, and is often employed in X-ray CT apparatuses since a cross-sectional image can be reconstructed from measured projection data with a small calculation amount.

The iterative method is a method of estimating a cross-sectional image through a repeated calculation on the basis of a model which is obtained by mathematically modeling an observation system for acquiring measured projection data or by statistically modeling fluctuation or the like in an amount of X rays included in the measured projection data. The iterative method is accompanied by repeated calculations and thus causes a calculation amount to be more than the analysis method, but can reduce or, artifact which comes from the analysis method, for example, a cone beam artifact, or quantum noise which comes from fluctuation in an amount of X rays.

The X-ray CT apparatus is widely used in medical sites as one of image diagnosis, but there are concerns about exposure to X rays. Particularly, in recent years, the attention to radiation exposure has been increased. For this reason, from the viewpoint of reduction in radiation exposure, the iterative method has attracted attention. The iterative method can reduce quantum noise even in measured projection data which is obtained with a low amount of rays. With the recent high performance of computers, the iterative method has been considered to be employed therein. For example, PTL 1 discloses an image processing apparatus which iteratively performs repeated calculations until an image measurement value within a region set on a cross-sectional image which is reconstructed using the analysis method reaches a desired value.

CITATION LIST

Patent Literature
[PTL 1] JP-A-2006-25868
[PTL 2] JP-A-2004-188163
Non Patent Literature
[NPL 1] H. Erdogan et. al., "Ordered subsets algorithms for transmission tomography," Phys. Med. Biol., Vol. 44, pp. 2835 to 2851, 1999

[NPL 2] K. Lange and J. Feeder, "Globally Convergent Algorithms for Maximum a Posteriori Transmission Tomography," IEEE. Trans. Image. Proc., Vol. 4, No. 10, pp. 1430 to 1438, October 1995

SUMMARY OF INVENTION

Technical Problem

However, even if the repeated calculation is iteratively performed multiple times, there are cases where an image with image quality different from that requested by an operator is produced. For example, even if an image of which the quantum noise is sufficiently smoothed is produced, there are cases where an artifact caused by a motion of an object is emphasized or a boundary between organs is unclear.

Therefore, an object of the present invention is to provide an image reconstruction device capable of creating an image with image quality matching an operator's request when a cross-sectional image is reconstructed through a repeated calculation.

Solution to Problem

In order to achieve the above object, according to the present invention, there are provided an image reconstruction device and an image reconstruction method capable of generating an iteratively reconstructed image by performing a repeated calculation on the basis of a value obtained by weighting and adding a pixel value obtained in the previous iteration to a pixel value obtained from now, using a weighting coefficient set based on an image quality parameter which is considered to be important by an operator.

Advantageous Effects of Invention

According to the present invention, it is possible to provide an image reconstruction device capable of creating an image with image quality matching an operator's request when a cross-sectional image is reconstructed through a repeated calculation.

DESCRIPTION OF EMBODIMENTS

Figure 1:
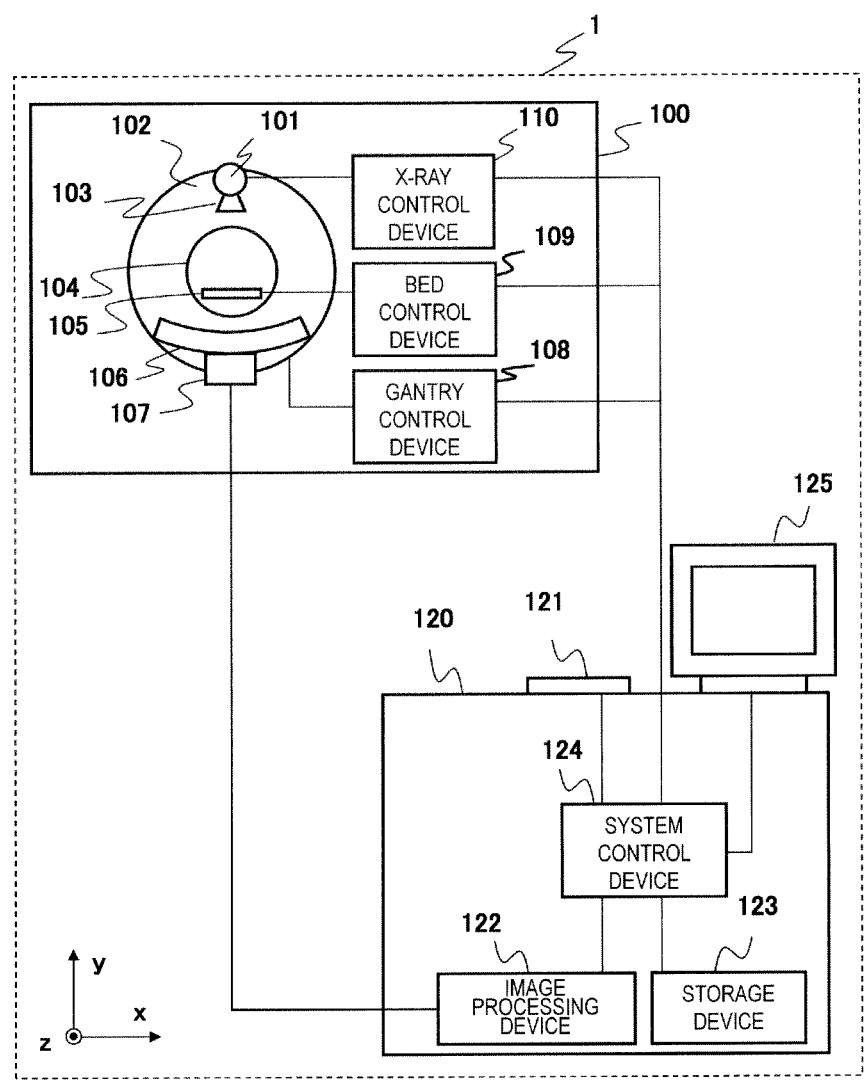
FIG. 1 is a block diagram illustrating an overall configuration of an X-ray CT apparatus 1.

According to an aspect of the present invention, there is provided an image reconstruction device which generates an iteratively reconstructed image by performing a repeated calculation on the basis of a difference between calculated projection data and measured projection data, the calculated projection data being obtained by performing a forward projection calculation on a reconstructed image which is reconstructed based on the measured projection data, the image reconstruction device including an acquisition section that acquires an image quality parameter which is considered to be important by an operator; a weight calculation section that calculates a weighting coefficient on the basis of the image quality parameter; and a repeated calculation section that performs a repeated calculation on the basis of a value obtained by weighting and adding a pixel value obtained in the previous iteration to a pixel value obtained from now using the weighting coefficient.

In addition, according to another aspect of the present invention, there is provided an image reconstruction method of generating an iteratively reconstructed image by performing a repeated calculation on the basis of a difference between calculated projection data and measured projection data, the calculated projection data being obtained by performing a forward projection calculation on a reconstructed image which is reconstructed based on the measured projection data, the image reconstruction method including acquisition of an image quality parameter which is considered to be important by an operator; weight calculation of calculating a weighting coefficient on the basis of the image quality parameter; and repeated calculation of performing a repeated calculation on the basis of a value obtained by weighting and adding a pixel value in the previous iteration to a pixel value in a current iteration using the weighting coefficient.

Hereinafter, a preferred embodiment of an image reconstruction device and an image reconstruction method according to the present invention will be described with reference to the accompanying drawings. In addition, in the following description and the accompanying drawings, constituent elements with the same function configuration are given the same reference numeral, and repeated description thereof will be omitted.

FIG. 1 is a block diagram illustrating an overall configuration of an X-ray CT apparatus used to acquire measured projection data. As illustrated in FIG. 1, an X-ray CT apparatus 1 includes a scan gantry unit 100 and an operation unit 120. In addition, in a coordinate system, as illustrated in the lower left part of FIG. 1, the horizontal direction is set as an x coordinate, the vertical direction set as a y coordinate, and the z direction perpendicular to a plane of FIG. 1 is set as a z direction.

The scan gantry unit 100 includes an X-ray tube device 101, a rotating disk 102, a collimator 103, an X-ray detector 106, a data collection device 107, a bed device 105, a gantry control device 108, a bed control device 109, and an X-ray control device 110. The X-ray tube device 101 is a device which irradiates an object placed on the bed device 105 with X rays. The collimator 103 is a device which restricts an irradiation range of X rays applied from the X-ray tube device 101. The rotating disk 102 includes an opening 104 which the object placed on the bed device 105 enters, has the X-ray tube device 101 and the X-ray detector 106 mounted therein, and rotates around the object. The X-ray detector 106 is a device which is disposed so as to be opposed to the X-ray tube device 101 and measures a spatial distribution of transmitted X rays by detecting the X rays transmitted through the object, and in which a plurality of detection elements are arranged in a two-dimensional manner in a rotation direction and a rotation axis direction of the rotating disk 102. The detection elements arranged in the rotation direction of the rotating disk 102 may be referred to as detection elements in a channel direction, and the detection elements arranged in the rotation axis direction may be referred to as detection elements in a slice direction. The data collection device 107 is a device which collects an X-ray amount detected by the X-ray detector 106 as digital data. The gantry control device 108 is a device which controls a rotation and a tilt of the rotating disk 102. The bed control device 109 is a device which controls vertical, front-back, and horizontal movements of the bed device 105. The X-ray control device 110 is a device which controls power input to the X-ray tube device 101.

The operation unit 120 includes an input device 121, an image processing device 122, a display device 125, a storage device 123, and a system control device 124. The input device 121 is a device for inputting the name of an object, the examination date and time, scanning conditions, and the like, and is, specifically, a keyboard, a pointing device, or the like. The image processing device 122 is a device which performs arithmetic processing on measured projection data sent from the data collection device 107, so as to reconstruct a cross-sectional image. The display device 125 is a device which displays a cross-sectional image created by the image processing device 122, and is, specifically, a CRT (Cathode-Ray Tube), a liquid crystal display, or the like. The storage device 123 is a device which stores data collected by the data collection device 107, image data of a cross-sectional image created by the image processing device 122, and the like, and is, specifically, a HDD (Hard Disk Drive). The system control device 124 is a device which controls the above devices, the gantry control device 108, the bed control device 109, and the X-ray control device 110. In addition, the system control device 124 may communicate with an external device via a network adaptor and a network (not illustrated).

The X-ray control device 110 controls power input to the X-ray tube device 101 on the basis of a scanning condition input from the input device 121, particularly, an X-ray tube voltage, an X-ray tube current, or the like, so that the X-ray tube device 101 irradiates an object with X rays corresponding to the scanning condition. The X-ray detector 106 detects X rays which are applied from the X-ray tube device 101 and are transmitted through the object with a plurality of X-ray detection elements, so as to measure a distribution of the transmitted X rays. The rotating disk 102 is controlled by the gantry control device 108, and rotates based on a scanning condition input from the input device 121, particularly, a rotation speed or the like. The bed device 105 is controlled by the bed control device 109, and operates based on a scanning condition input from the input device 121, particularly, a helical pitch or the like.

The X-ray irradiation from the X-ray tube device 101 and the measurement of the transmitted X-ray distribution by the X-ray detector 106 are iteratively performed along with the rotation of the rotating disk 102, and thus measured projection data from various angles is acquired. The measured projection data is acquired at discrete positions in the rotation direction of the rotating disk 102, and the acquisition unit of the measured projection data at each position is referred to as a "view". The measured projection data for each view is transmitted to the image processing device 122. The image processing device 122 reconstructs a cross-sectional image in the analysis method on the basis of the transmitted measured projection data. The reconstructed cross-sectional image is displayed on the display device 125.

The cross-sectional image reconstructed in the analysis method includes an artifact which comes from the analysis method, for example, a cone beam artifact, quantum noise which comes from fluctuation in an amount of X rays, or the like. The image reconstruction device according to the present invention creates a cross-sectional image with the reduced cone beam artifact or quantum noise and image quality matching an operator's request through a flow of processes described later. The processes may be performed by the system control device 124 or may be performed by the image processing device 122.

A flow of processes performed by the image reconstruction device of the present invention is executed after measured projection data is acquired. Therefore, the image reconstruction device of the present invention may be the image processing device 122 which is included in the X-ray CT apparatus 1, or may be a general purpose computer which is not included in the X-ray CT apparatus 1. In addition, an input device, a display device, and a storage device included in the image reconstruction device of the present invention may be the input device 121, the display device 125, and the storage device 123 included in the X-ray CT apparatus 1, may be respective devices included in the general purpose computer, or may be external devices. Hereinafter, the image processing device 122 will be described as an image reconstruction device of the present invention, and the input device 121, the display device 125, and the storage device 123 will be described as an input device, a display device, and a storage device included in the image reconstruction device.

Figure 2:
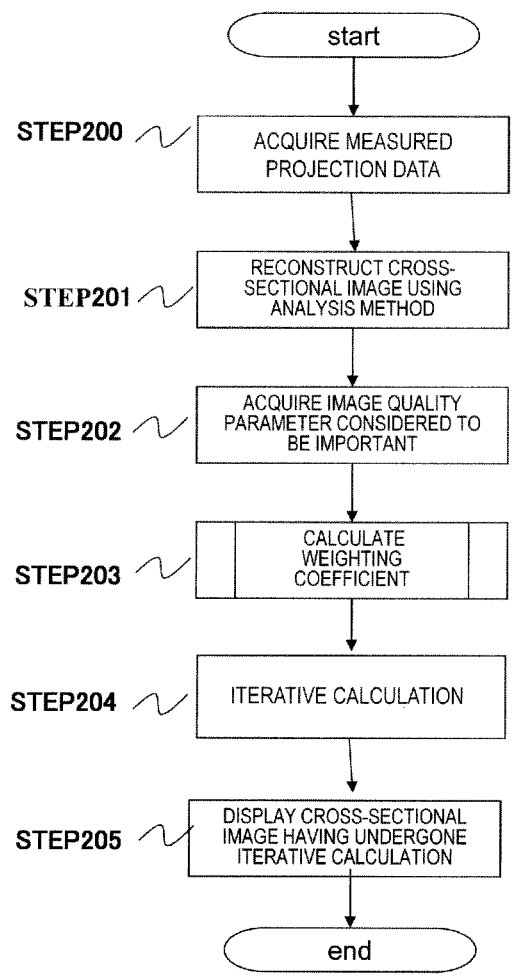
FIG. 2 is a diagram illustrating a flow of processes performed by an image reconstruction device.

FIG. 2 illustrates a flow of processes performed by the image reconstruction device of the present invention. Hereinafter, each step of FIG. 2 will be described in detail.

(Step 200)

The image processing device 122 acquires measured projection data. The acquired measured projection data may be data which is measured in the scan gantry unit 100, or may be data stored in the storage device 123.

(Step 201)

The image processing device 122 performs arithmetic processing on the measured projection data acquired in Step 200 in the analysis method so as to reconstruct a cross-sectional image. The reconstructed cross-sectional image is displayed on the display device 125.

(Step 202)

The image processing device 122 acquires an image quality parameter which is considered to be important by an operator.

Figure 3:
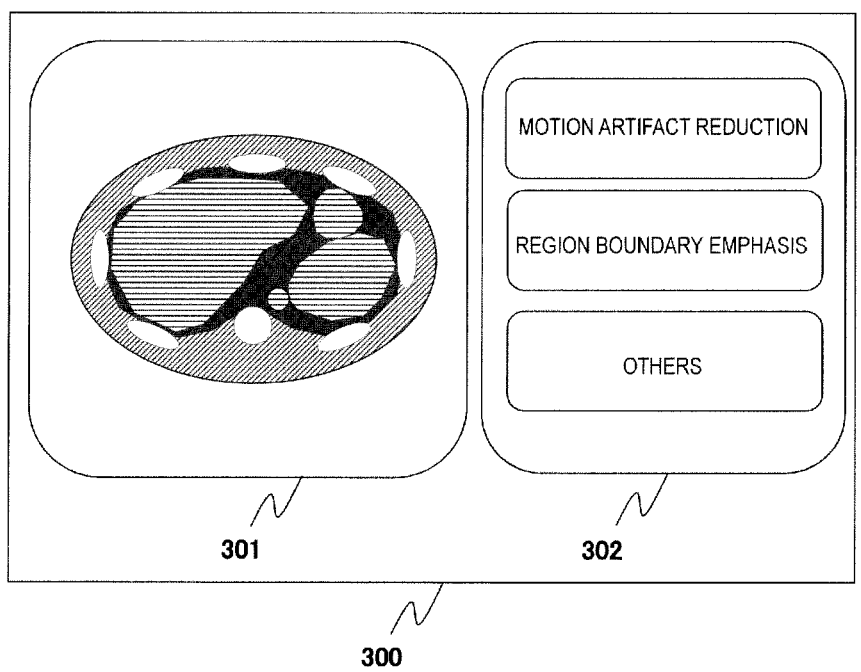
FIG. 3 is a diagram illustrating an example of a screen used in Step 202.

For example, a screen 300 illustrated in FIG. 3 may be used to acquire the image quality parameter which is considered to be important. The screen 300 is displayed on the display device 125, and includes a cross-sectional image display portion 301 and an image quality parameter setting portion 302. The cross-sectional image display portion 301 displays the cross-sectional image reconstructed in Step 201. The kind of image quality parameter which can be selected by the operator is displayed in the image quality parameter setting portion 302. In the example of FIG. 3, a motion artifact reduction and a region boundary emphasis are displayed as the image quality parameter. Naturally, other image quality parameters may also be displayed.

The operator selects an image quality parameter which is considered to be important, of the ones displayed in the image quality parameter setting portion 302, by using the input device 121. When the image quality parameter is selected, a cross-sectional image displayed on the cross-sectional image display portion 301 may be referred to. Specifically, if the operator views a cross-sectional image displayed on the cross-sectional image display portion 301 and considers that a motion artifact is not desired to be emphasized, the operator may select the motion artifact reduction. If the operator considers that a boundary between regions is desired to be clear, the operator may select the region boundary emphasis.

In addition, an image quality parameter which is considered to be important by an operator may be set in advance for each device. In a case where an image quality parameter which is considered to be important is set in advance, the screen 300 may not be displayed.

(Step 203)

The image processing device 122 calculates a weighting coefficient on the basis of the image quality parameter acquired in Step 202.

Figure 4:
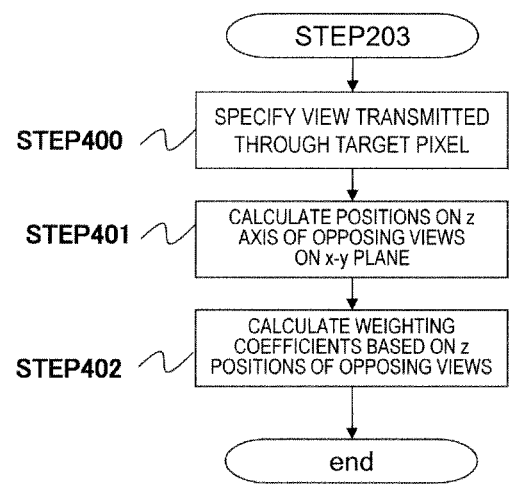
FIG. 4 is a diagram illustrating a first example of a flow of processes in Step 203.

FIG. 4 illustrates a flow of processes in this step when the motion artifact reduction is acquired in Step 202. Hereinafter, each step of FIG. 4 will be described in detail.

(Step 400)

The image processing device 122 specifies views which are transmitted through a target pixel in the cross-sectional image. The views transmitted through the target pixel are discretely present over a range of 360 degrees on the x-y plane.

(Step 401)

The image processing device 122 calculates positions on the z axis of opposing views on the x-y plane. The opposing views on the x-y plane have X-ray transmission paths which overlap each other, and thus measured projection data thereof has high correlation.

Figure 5:
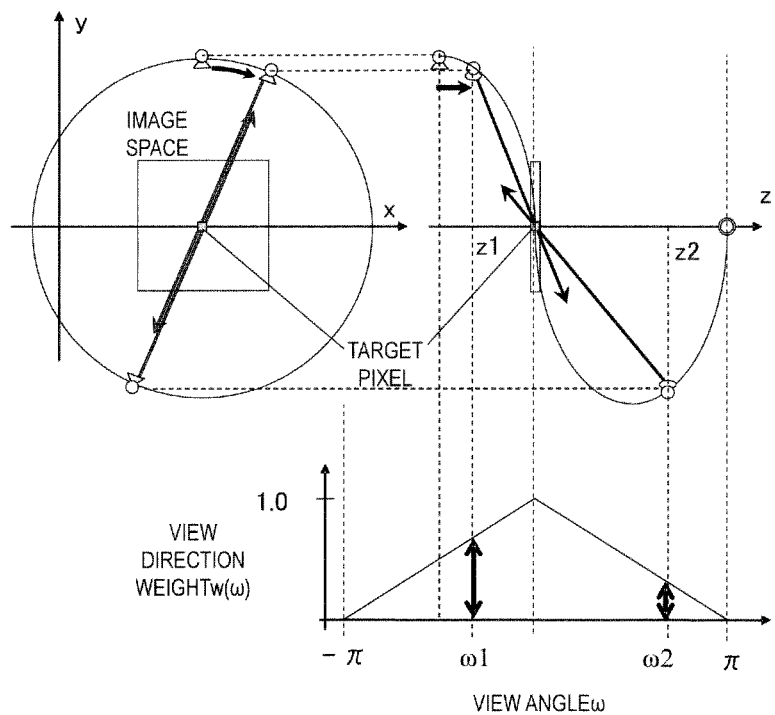
FIG. 5 is a diagram illustrating an example of a view direction weight.

With reference to FIG. 5, positions on the z axis of opposing views on the x-y plane will be described. When the X-ray tube device 101 draws a helical trajectory with respect to an object, and measured projection data is acquired, opposing views on the x-y plane have different positions on the z axis, among views transmitted through the target pixel. For example, positions on the z axis of views which are transmitted through a target pixel of FIG. 5 and oppose each other are $z1$ and $z2$. The position on the z axis of the opposing views on the x-y plane may be calculated using a coordinate of the target pixel on the x-y plane, a helical pitch, a pitch of the detector elements, and the like.

(Step 402)

The image processing device 122 calculates weighting coefficients based on the z positions of the opposing views.

Any coefficients may be used as weighting coefficients of opposing views so long as a sum of both is a constant value. For example, weighting coefficients as disclosed in PTL 1 may be used.

In PTL 2, a position on the z axis where a target pixel is located is set as a central view, and a weighting coefficient is set based on a distance on the z axis from the central view to a corresponding view. In addition, a weighting coefficient is made 0 in a range of exceeding a predetermined number of views from the central view. In the example of FIG. 5, since $z1$ is closer to the central view than $z2$, a weighting coefficient of the view corresponding to $z1$ is set to be greater than a weighting coefficient of the view corresponding to $z2$.

As above, by using a weighting coefficient which is set based on a distance from a position on the z axis where a target pixel is located, a view having a smaller difference in time points when measured projection data is acquired is considered to be more important. In other words, it is possible to reduce a motion artifact by using the weighting coefficient.

(Step 204)

The image processing device 122 creates a cross-sectional image again through the repeated calculation.

Hereinafter, this step will be described in detail.

First, an evaluation function is set.

The iterative method is a method in which an evaluation index of an image is set in advance, and the image is iteratively updated so that an evaluation value obtained by digitalizing the evaluation index reaches a maximal value or a minimal value. As the evaluation index, contradiction between data obtained through a forward projection process on an image on the basis of a mathematical model which mathematically models an observation system for acquiring measured projection data and the measured projection data, probability likelihood, or the like is used. A function for calculating an evaluation value is called an evaluation function, and several evaluation functions are proposed by various documents. Hereinafter, an example of an evaluation function will be described.

NPL 1 proposes an iterative method of using a weighted square error function with penalty as an evaluation function, and the evaluation function may be expressed by the following equation.

$$L(x_1, \ldots, x_J) = \sum_{i=1}^{I} \frac{d_i}{2} \left( y_i - \sum_{j=1}^{J} a_{ij} x_j \right)^2 + \beta R(x_1, \ldots, x_J) \quad \text{[Expression 1]}$$

Here, $x_i, \ldots$ and $x_j, \ldots$ indicate $x_J$ pixel values of an image, $y_1, \ldots, y_i, \ldots$ and $y_I$ indicate measured projection data, and $d_1, \ldots, d_i, \ldots$ and $d_I$ indicate detector output weights. In addition, $\alpha_{ij}$ indicates an element of a matrix which correlates a j-th pixel with i-th projection data, and this matrix indicates characteristics of a scanning system via the above-described mathematical model and is thus called a system matrix.

In addition, $$\sum_{j=1}^{J} a_{ij} x_j$$

is the above-described forward projection data, and is a value obtained by converting the image of $x_1, \ldots, x_j, \ldots$ and $x_J$ into projection data on the basis of the system matrix. $R(x_1, x_j, \ldots$ and $x_J)$ is a penalty term, and $\beta$ is a penalty term weight for determining the smoothness of an image.

In addition, a case where a penalty term is not included in an evaluation function may also be treated in the same manner, and the evaluation function of the following equation is called a weighted square error function.

$$L(x_1, \ldots, x_J) = \sum_{i=1}^{I} \frac{d_i}{2} \left( y_i - \sum_{j=1}^{J} a_{ij} x_j \right)^2 \quad \text{[Expression 2]}$$

Further, NPL 2 proposes an iterative method of using a posteriori function as an evaluation function, and the evaluation function may be expressed by the following equation $$L(x_1, \ldots, x_J) = \quad \text{[Expression 3]}$$
$$-\sum_{i=1}^{I} \left[ d_i \sum_{j=1}^{J} a_{ij} x_j + d_T e^{-\sum_{j=1}^{J} a_{ij} x_j} \right] + \beta R(x_1, \ldots, x_J)$$

Here, $d_T$ indicates the number of photons irradiated from an X-ray tube. In addition, an evaluation function which excludes the penalty term weight in Expression 3 is called a likelihood function which may be expressed by the following equation.

$$L(x_1, \ldots, x_J) = -\sum_{i=1}^{I} \left[ d_i \sum_{j=1}^{J} a_{ij} x_j + d_T e^{-\sum_{j=1}^{J} a_{ij} x_j} \right] \quad \text{[Expressoin 4]}$$

The above four kinds of evaluation functions allow an iterative method to take into consideration a statistical property of projection data, and an iterative method of using these evaluation functions is called a statistical iterative method.

Any evaluation function may be used in the present invention. Hereinafter, a description will be made using the weighted square error function with penalty of Expression 1.

Next, forward projection data is replaced.

If the evaluation function is to be used, in the course of the repeated calculation, a forward projection process is required to be performed using a cross-sectional image at that time. For example, the repeated calculation is performed using Expression 1, and thus a cross-sectional image in which quantum noise is smoothed can be created based on the measured projection data and the detector output weight.

However, there are cases where an artifact caused by a motion of an object is emphasized or a boundary between organs is unclear just by performing the repeated calculation.

Therefore, in the present invention, the forward projection data is replaced with the following expression.

$$\sum_{j=1}^{J} a_{ij} x_j \rightarrow \sum_{j=1}^{J} a_{ij} \{w_{ij} x_j + (1 - w_{ij}) x_j^{(n)}\} \quad \text{[Expression 5]}$$

Here, $w_{ij}$ indicates a weighting coefficient of a j-th pixel for i-th projection data, and $x_j^{(n)}$ indicates an j-th pixel value in an n-th iterative image in iterative update. In Expression 5, the pixel value $x_j$ which is an estimation variable is combined with the pixel value $x_j^{(n)}$ of a recent image in the iterative update by a view direction weight. At this time, combination coefficients of both are set to become 1 when added together.

The forward projection data is replaced in this way, and thus the repeated calculation can be performed while a pixel value obtained in the previous iteration is taken over to a pixel value obtained from now. Accordingly, since a pixel value in the previous iteration is taken over at all times, it is possible to maintain a feature of a cross-sectional image reconstructed in the analysis method, that is, a small motion artifact or a clear region boundary. An extent in which a pixel value in the previous iteration is taken over is determined by the magnitude of a weighting coefficient calculated in Step 203.

The image processing device 122 performs the repeated calculation by using an updated expression which is created based on the setting of the evaluation function and the replacement of the forward projection data.

Expression 1 is replaced with the following expression using Expression 5.

$$L(x_1, \ldots, x_J) = \quad \text{[Expression 6]}$$
$$\sum_{i=1}^{I} \frac{d_i}{2} \left[ y_i - \sum_{j=1}^{J} a_{ij} \{w_{ij} x_j + (1 - w_{ij}) x_j^{(n)}\} \right]^2 +$$
$$\beta R(x_1, \ldots, x_J)$$

Similarly, Expression 3 may be replaced with the following expression.

$$L(x_1, \ldots, x_J) = \quad \text{[Expression 7]}$$
$$-\sum_{i=1}^{I} \frac{d_i}{2} \left[ y_i - \sum_{j=1}^{J} a_{ij} \{w_{ij} x_j + (1 - w_{ij}) x_j^{(n)}\} + \right.$$
$$\left. d_T e^{-\sum_{j=1}^{J} a_{ij} \{w_{ij} x_j + (1 - w_{ij}) x_j^{(n)}\}} \right]$$

Hereinafter, a description will be made of a procedure in which an update expression is derived from the evaluation function of Expression 6, and iterative update is performed.

A description will be made of a case where Separable Paraboloidal Surrogate (SPS) proposed in NPL 1 is applied to the evaluation function of Expression 6 generated in the present invention. SPS can independently update each pixel, and thus has an advantage in that parallel calculation is simple.

First, SPS is applied to Expression 6 so as to obtain the following expression.

$$L(x_1, \ldots, x_J) = \quad \text{[Expression 8]}$$

$$\sum_{i=1}^{I}\sum_{j=1}^{J} \frac{d_i \alpha_{ij}}{2}\left[y_i - \frac{a_{ij}w_{ij}}{\alpha_{ij}}(x_j - x_j^{(n)}) - \sum_{k=1}^{J} a_{ik}x_k^{(n)}\right]^2 +$$

$$\beta R(x_1, \ldots, x_J)$$

Here, $\alpha_{ij}$ is a coefficient of a convex combination, and may be expressed by the following expression.

$$\alpha_{ij} = \frac{a_{ij}}{\sum_{k=1}^{J} a_{ik}} \quad \text{[Expression 9]}$$

Further, the Newton method is applied to Expression 9, and thus an update expression of SPS becomes the following expression.

$$x_j^{(n+1)} = x_j^{(n)} + \gamma \frac{\left.\frac{\partial L(x_1, \ldots, x_J)}{\partial x_j}\right|_{x_j=x_j^{(n)}}}{\left.\frac{\partial^2 L(x_1, \ldots, x_J)}{\partial x_j^2}\right|_{x_j=x_j^{(n)}}} \quad \text{[Expression 10]}$$

Here, the following expressions are given.

$$\left.\frac{\partial L(x_1, \ldots, x_J)}{\partial x_j}\right|_{x_j=x_j^{(n)}} = \quad \text{[Expression 11]}$$

$$\sum_{i=1}^{I} d_i a_{ij} w_{ij}\left(y_i - \sum_{k=1}^{J} a_{ik}x_k\right) + \beta \frac{\partial R(x_1, \ldots, x_J)}{\partial x_j}$$

$$\left.\frac{\partial^2 L(x_1, \ldots, x_J)}{\partial x_j^2}\right|_{x_j=x_j^{(n)}} = \quad \text{[Expression 12]}$$

$$\sum_{i=1}^{I} d_i a_{ij} w_{ij}^2 \sum_{k=1}^{J} a_{ik} + \beta \frac{\partial^2 R(x_1, \ldots, x_J)}{\partial x_j^2}$$

In addition, $\gamma$ of Expression 10 is a relaxation coefficient for adjusting an update step width, and is a parameter for stabilizing convergence and adjusting an update speed. $\gamma$ may be determined empirically, and may be calculated in a method disclosed in, for example, PTL 3.

Expressions 10, 11 and 12 are update expressions, and the repeated calculation is performed as follows based on the update expressions.

First, the first term of Expression 12 is calculated. This term is a constant, and thus may be calculated once in advance. Next, the second term of Expression 12, and Expression 11 are calculated. Subsequently, the cross-sectional image is updated based on Expression 10, and the calculation is iteratively performed until a preset convergence condition, for example, the number of iterative updates is satisfied. When the preset convergence condition is satisfied, the repeated calculation stops.

Although a derivation example of an update expression using SPS has been described here, the evaluation functions according to the present invention may be combined with all of the well-known numerical analysis methods, and may employ, for example, Iterative Coordinate Descent (ICD).

(Step 205)

The image processing device 122 displays the cross-sectional image having undergone the repeated calculation in Step 204 on the display device 125.

The image reconstruction device of the present invention executes the above-described flow of the processes, and thus it is possible to produce an image in which quantum noise is sufficiently smoothed while matching an operator's request, particularly, motion artifact reduction.

Next, a second example of a flow of processes in Step 203 will be described.

Figure 6:
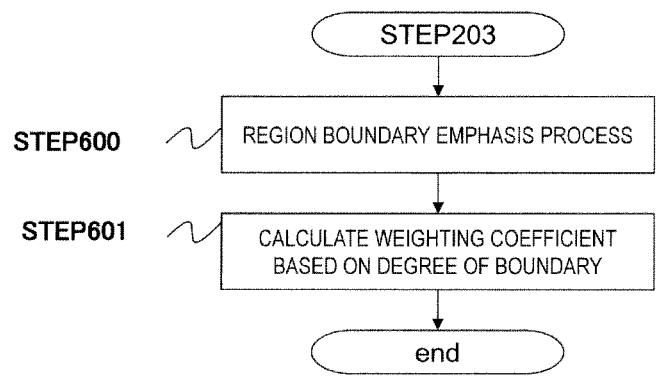
FIG. 6 is a diagram illustrating a second example of a flow of the process in Step 203.

FIG. 6 illustrates a flow of processes in Step 203 in a case where the region boundary emphasis is acquired in Step 202. Hereinafter, each step of FIG. 6 will be described in detail.

(Step 600)

The image processing device 122 performs a process of emphasizing a region boundary within the cross-sectional image reconstructed in Step 201. For example, a well-known edge emphasis process is performed on the cross-sectional image. For each pixel in the cross-sectional image having undergone the edge emphasis process, a numerical value indicating whether or not the pixel corresponds to the region boundary is given. If a difference between a pixel value of a peripheral pixel and a pixel value of the corresponding pixel is large, a degree as the region boundary is high, and if the difference is small, a degree as the region boundary is low.

(Step 601)

The image processing device 122 calculates a weighting coefficient of each pixel based on the degree as the region boundarydigitalized in Step 600. In other words, if the degree as the region boundary is high, the weighting coefficient also increases, and if the degree as the region boundary is low, the weighting coefficient also decreases.

The weighting coefficients calculated in this step is used in Step 204. Consequently, the repeated calculation is performed in succession to a feature of the region boundary of the cross-sectional image reconstructed in Step 201, and thus it is possible to produce the cross-sectional image in which quantum noise is sufficiently smoothed while maintaining a state in which a boundary between organs is clear.

As above, although the embodiment of the present invention will be described, the present invention is not limited to this embodiment.

REFERENCE SIGNS LIST

1 X-ray CT apparatus
100 Scan gantry unit
101 X-ray tube device
102 Rotating disk
103 Collimator
104 Opening
105 Bed device
106 X-ray detector
107 Data collection device
108 Gantry control device
109 Bed control device
110 X-ray control device
120 Operation unit
121 Input device
122 Image processing device
123 Storage device 124 System control device
125 Display device

The invention claimed is:

1. An image reconstruction device which generates an iteratively reconstructed image by performing a repeated calculation on the basis of a difference between calculated projection data and measured projection data, the calculated projection data being obtained by performing a forward projection calculation on a reconstructed image which is reconstructed based on the measured projection data, the image reconstruction device comprising:
   an input section to which an image quality parameter which is considered to be important by an operator is input;
   a weight calculation section that calculates a weighting coefficient on the basis of the image quality parameter; and
   a repeated calculation section that performs a repeated calculation on the basis of a value obtained by weighted addition of a pixel value obtained in the previous iteration and a pixel value obtained from now using the weighting coefficient.

2. The image reconstruction device according to claim 1, wherein at least one of motion artifact reduction and region boundary emphasis is input to the input section as the image quality parameter.

3. The image reconstruction device according to claim 2, wherein the weight calculation section calculates a view direction weight which is determined based on a distance perpendicular to the reconstructed image as a weighting coefficient when the motion artifact reduction is input as the image quality parameter.

4. The image reconstruction device according to claim 3, wherein the view direction weight is determined based on a distance from a view which is transmitted through a target pixel on the reconstructed image to the reconstructed image.

5. The image reconstruction device according to claim 2, wherein the weight calculation unit calculates a degree of a region boundary in the reconstructed image when the region boundary emphasis is input as the image quality parameter, and calculates a weighting coefficient based on the degree.

6. The image reconstruction device according to claim 5, wherein the degree of the region boundary is calculated using an image obtained by performing an edge emphasis process on the reconstructed image.

7. An image reconstruction method of generating an iteratively reconstructed image by performing a repeated calculation on the basis of a difference between calculated projection data and measured projection data, the calculated projection data being obtained by performing a forward projection calculation on a reconstructed image which is reconstructed based on the measured projection data, the image reconstruction method comprising:
   acquisition of acquiring an image quality parameter which is considered to be important by an operator;
   weight calculation of calculating a weighting coefficient on the basis of the image quality parameter; and
   repeated calculation of performing a repeated calculation on the basis of a value obtained by weighted addition of a pixel value obtained in the previous iteration and a pixel value in a current iteration using the weighting coefficient.

8. The image reconstruction method according to claim 7, wherein the repeated calculation is as follows:

$$\sum_{j=1}^{J} a_{ij} x_j \rightarrow \sum_{j=1}^{J} a_{ij} \{w_{ij} x_j + (1 - w_{ij}) x_j^{(n)}\}$$

where $\alpha_{ij}$ is a coefficient value to correlate a j-th pixel with an i-th projection data, $x_j$ is a current value of the j-th pixel, $w_{ij}$ indicates a weighting coefficient of the j-th pixel for the i-th projection data, and $x_j^{(n)}$ is a j-th pixel value in an n-th iterative image in iterative update.

9. The image reconstruction device according to claim 1, wherein the repeated calculation is as follows:

$$\sum_{j=1}^{J} a_{ij} x_j \rightarrow \sum_{j=1}^{J} a_{ij} \{w_{ij} x_j + (1 - w_{ij}) x_j^{(n)}\}$$

where $\alpha_{ij}$ is a coefficient value to correlate a j-th pixel with an i-th projection data, $x_j$ is a current value of the j-th pixel, $w_{ij}$ indicates a weighting coefficient of the j-th pixel for the i-th projection data, and $x_j^{(n)}$ is a j-th pixel value in an n-th iterative image in iterative update.

* * * * *

UNITED STATES PATENT AND TRADEMARK OFFICE
CERTIFICATE OF CORRECTION

| | | |
|---|---|---|
| PATENT NO. | : 9,159,146 B2 | Page 1 of 1 |
| APPLICATION NO. | : 14/128769 | |
| DATED | : October 13, 2015 | |
| INVENTOR(S) | : Takahashi et al. | |

It is certified that error appears in the above-identified patent and that said Letters Patent is hereby corrected as shown below:

On the title page item [86], insert
        --(86)    PCT No.:      PCT/JP2012/067142--.

Signed and Sealed this
Fourteenth Day of June, 2016

Michelle K. Lee
*Director of the United States Patent and Trademark Office*